Dec. 14, 1937.  M. EICHELGRÜN  2,102,522
LATTICE TOWER WITH LIFT FOR PEOPLE IN PARKS EXHIBITIONS AND THE LIKE
Filed April 15, 1936   2 Sheets-Sheet 1
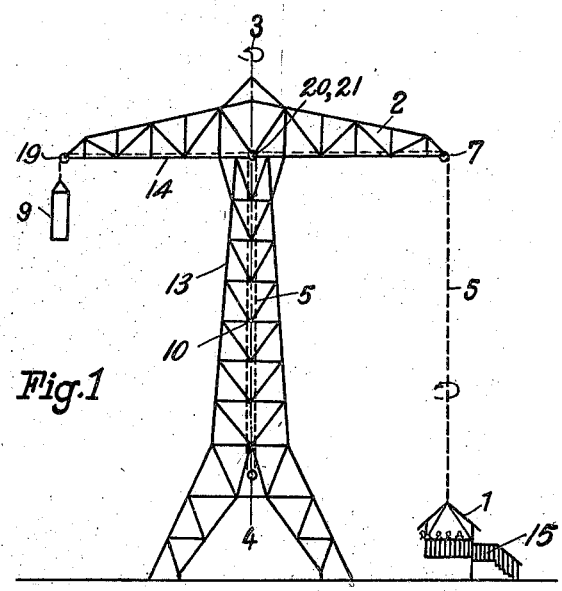
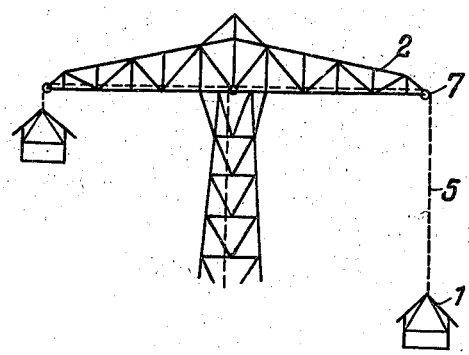
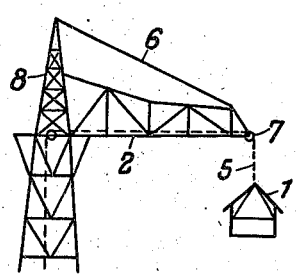
Inventor:
Martin Eichelgrün
By Hans Bernhard
Attorney Dec. 14, 1937.                M. EICHELGRÜN                 2,102,522
       LATTICE TOWER WITH LIFT FOR PEOPLE IN PARKS EXHIBITIONS AND THE LIKE
                        Filed April 15, 1936      2 Sheets-Sheet 2
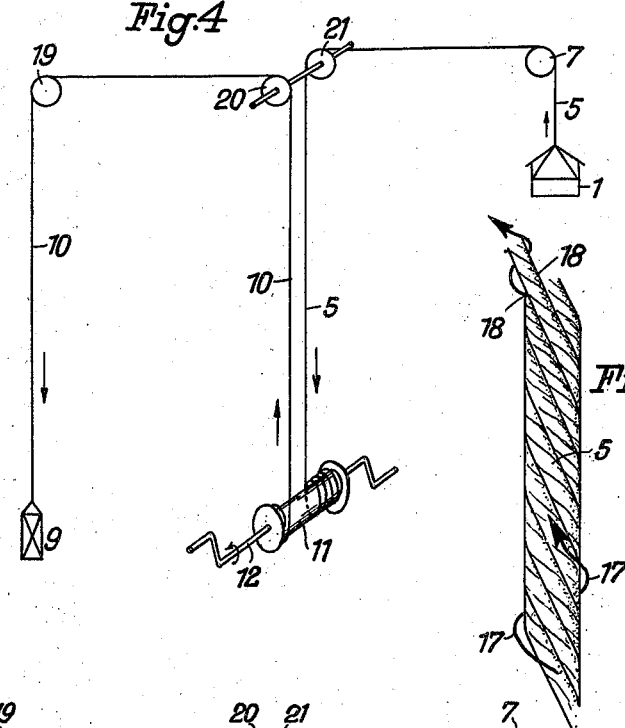
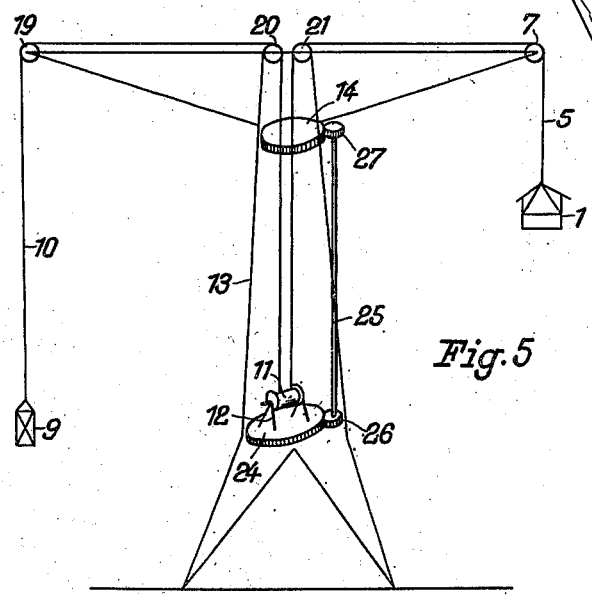
Inventor:
Martin Eichelgrün
By Hans Berchard
Attorney Patented Dec. 14, 1937

2,102,522

UNITED STATES PATENT OFFICE 2,102,522

LATTICE TOWER WITH LIFT FOR PEOPLE IN PARKS, EXHIBITIONS, AND THE LIKE

Martin Eichelgrün, London, England

Application April 15, 1936, Serial No. 74,504
In Germany April 16, 1935

2 Claims. (Cl. 272—6)

The invention relates to lifts in lattice towers for conveying people to a considerable height for obtaining an extended view of the country.

The object of the invention is to produce a tower lift affording a free outlook not hindered by guiding devices for the cage and permitting of a general view, by a slow turning movement of the cage around the tower axis and if desired also around the axis of the cage itself. Thus as compared to ordinary lifts a chance will be given for enjoying the view by an all around outlook without need for people to change their seat in the cage. Circular movements combined with up and down movements are already known in carousels, where also swinging movements are sometimes combined with circular movements. In the present invention however the lifting movement takes the priority.

The figures represent such a lift as an example.

Fig. 1 shows a tower with two jibs, a cage and a counterweight,

Fig. 2 the upper part of a tower with two jibs and two cages.

Fig. 3 shows a tower with one jib and rollers guiding the ropes carrying the cage and the counterweight, Fig. 4 the arrangement of the guiding rollers and the winch, Fig. 5 the same but in combination with the tower and Fig. 6 illustrates the rope with long twist.

In Fig. 1 the jib 2 carrying the cage 1 is arranged to turn around the axis 3, 4 of the tower in the direction of the arrow. In order to assure the stability of the tower a second jib having a counterweight 9 is provided in an opposite direction. Parts are so arranged, that the jibs will execute a turning movement around the axis 3, 4 while the cage is rising or sinking and the latter will travel on a steep helicoidal line.

The cage and counterweight are arranged in such a manner that the one is lowered while the other one is raised. The cage may therefore be lowered until it reaches a landing stage 15 which makes it unnecessary for the passengers to climb up or descend the tower but they can enter and leave the cage on the ground level.

As indicated in Fig. 4 two ropes are provided. A rope 5 from which the cage 1 is suspended and which passes over rollers 7 and 21 to the drum of a winch 11, one end of the rope being fastened to the drum at one end thereof. A second rope 10 supports the counterweight 9 and passes over rollers 19 and 20, the roller 20 being keyed to the same shaft as the roller 21. The rope 10 is likewise fastened to the drum of the winch 11 but at the end opposite to that to which the rope 5 is fastened. The two ropes may be wrapped around the drum in opposite directions and for this purpose the two halves of the drum are provided with helical grooves in opposite directions to serve as guides for the two ropes as they are wound onto the drum. Thus while one rope is wound onto the drum the other is unwound.

As shown in Fig. 5 the parts are so arranged as to prevent a twisting together of the two ropes 5 and 10 when the jib is rotated. For this purpose the winch 11 is supported on a circular lower platform 24 by means of pedestals 12, the platform being provided with a toothed rim which meshes with a pinion 26 and which pinion may be engaged by a driving gear not shown in the drawings. The pinion is keyed to a vertical shaft 25 which extends upwardly to an upper circular platform 14 (Fig. 1). The upper platform supports the jibs and is likewise provided with a toothed rim which meshes with the pinion 27 keyed to the upper end of the vertical shaft 25. The center of the platform 14 is provided with an opening for the passage of the ropes 5 and 10. This arrangement permits the simultaneous rotation of the two platforms while maintaining the vertical inner portion of the two ropes always in substantially the same plane.

According to Fig. 3 the jib 2 may also be only on one side. The tower will have then a corresponding upper extension 8 to which is attached a thrust band 6.

A rotational movement around the axis of the supporting rope simultaneously with the rotational movement around the axis of the tower, both in the same or in opposite direction may be produced by providing a rope 5 as illustrated in Fig. 6. The rope comprises three parallel strands which may be twisted in the usual manner, for example in a clockwise direction, as indicated by the arrows 17. The three strands are then twisted together into a single rope by a steep twist in the same direction as the twist of the individual strands. Such a rope has the tendency of twisting and untwisting as it passes the guide rollers, upon lowering and raising of the cage, thus producing a rotation of the cage around the axis of the rope, as the cage is raised and lowered, the respective directions of rotation depending upon the direction in which the rope is wound upon the drum relative to the direction of rotation of the jib.

What I claim is:—

1. In a lattice tower of the kind described and in combination, an upper circular platform rotatably mounted on said tower and having a toothed edge, a jib carried by said platform, and a lower platform, similar to the first, rotably mounted in said tower, a winch carried by the lower platform, a vertical shaft carrying pinions meshing with the toothed edges of the upper and lower platform, two ropes wound from opposite sides upon the drum of said winch, a cage attached to the free end of one rope and a countershaft attached to the free end of the other rope, guide rollers extending said ropes from the winch over the ends of the jib to the cage and to the counterweight and a landing stage on even ground located to meet the cage in its lowered position.

2. In a lattice tower according to claim 1 the rope attached to the cage being provided with a long twist to permit an individual rotating movement of said cage besides its rotating movement around the lattice tower.

MARTIN EICHELGRÜN.